Figure 1:
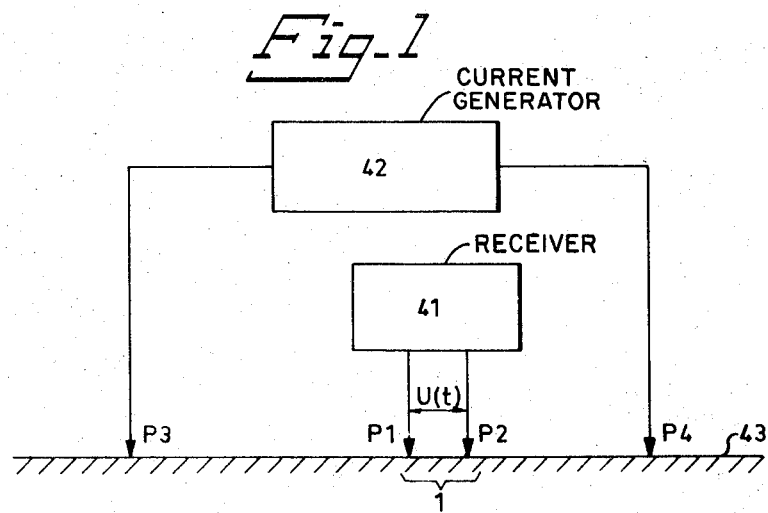

United States Patent [19]
Nilsson

[11] 3,849,722
[45] Nov. 19, 1974

[54] METHOD AND APPARATUS FOR DIGITALLY DETERMINING THE COMPLEX ELECTRIC FIELD WHEN CARRYING OUT PROSPECTING OPERATIONS

[75] Inventor: Bruno Yngve Nilsson, Boliden, Sweden

[73] Assignee: Boliden Aktiebolag, Stockholm, Sweden

[22] Filed: July 2, 1973

[21] Appl. No.: 375,923

[30] Foreign Application Priority Data
July 26, 1972   Sweden.............................. 9758/72

[52] U.S. Cl. ........................................ 324/9, 324/7
[51] Int. Cl. ......................... G01v 3/06, G01v 3/08
[58] Field of Search ........................... 324/1, 6, 7, 9

[56]           References Cited
           UNITED STATES PATENTS
3,525,037   8/1970   Madden et al...................... 324/6 X
3,679,978   7/1972   Hopkins............................. 324/7 X
3,701,940   10/1972  Nilsson et al........................ 324/1

Primary Examiner—Gerard H. Strecker
Attorney, Agent, or Firm—Stevens, Davis, Miller & Mosher

[57]   ABSTRACT

A method and an apparatus to be used in prospecting work for digitally determining the complex electric field generated when passing an alternating current to the ground, by determining potential differences in the field with respect to phase and amplitude. The potential differences are converted into a pulse train having a frequency which is proportional to the momentary value of the voltage occurring as a result of the potential differences. The pulses in the train are counted for a determined length of time, and a sign signal is produced from the potential differences, the signal representing the sign of the voltage. Signals which determine if the pulses in the train shall be added or subtracted when counted are produced in response to the character signals and to a reference voltage having a known relation to the alternating current passed to ground.

7 Claims, 4 Drawing Figures

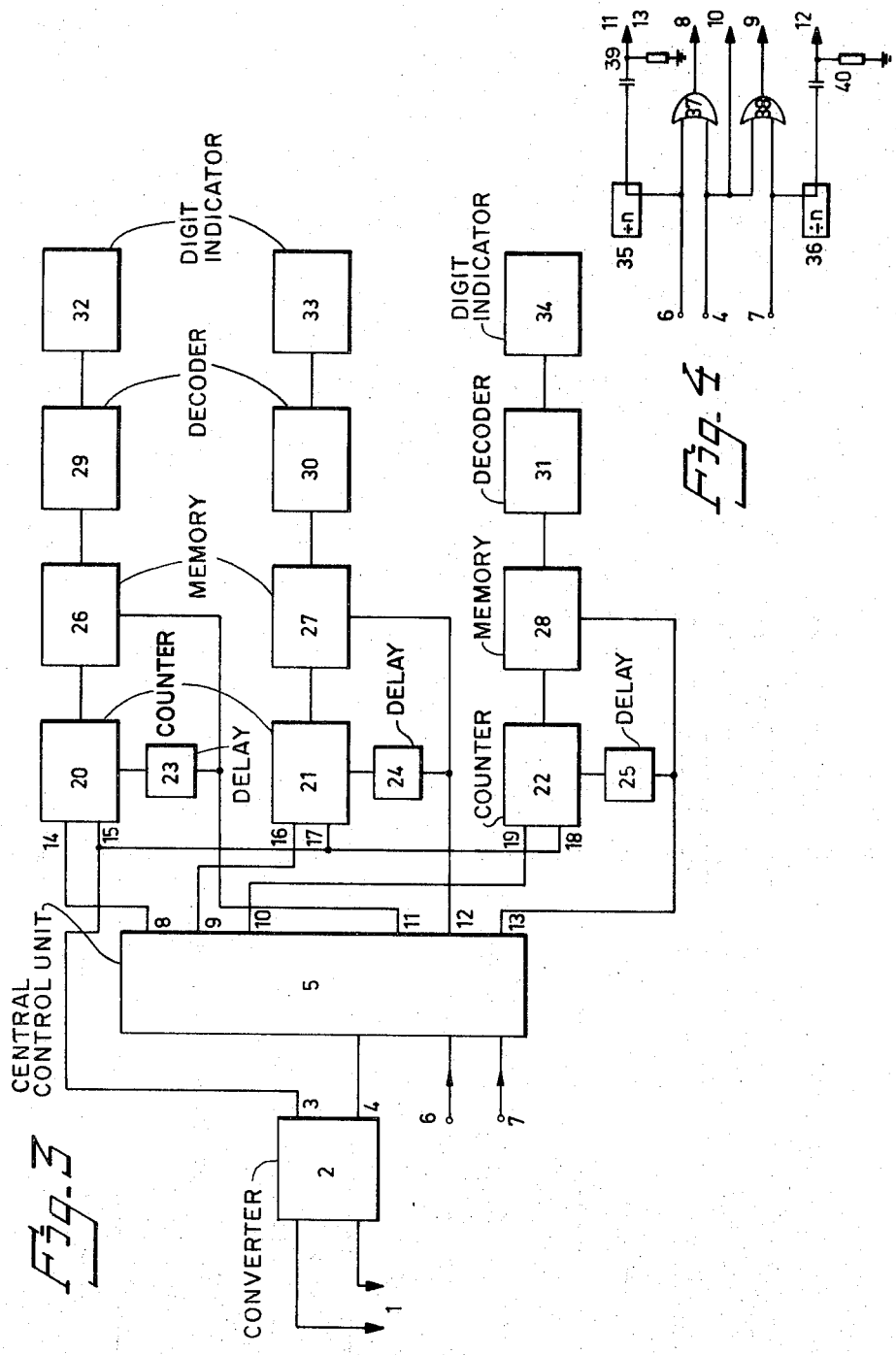

METHOD AND APPARATUS FOR DIGITALLY DETERMINING THE COMPLEX ELECTRIC FIELD WHEN CARRYING OUT PROSPECTING OPERATIONS

The present invention relates to a method and an apparatus for digitally determining, when carrying out prospecting operations, the complex electric field generated when feeding an AC current to the ground, by determining differences in potential in the field with respect to phase and amplitude.

It has long been known within the geophysical field to utilize electrical methods when prospecting for ore and other subterrainial material finds, and a number of methods have been developed for determining at low frequencies of the order of 0.01 – 10 Hz the complex electric fields occurring when applying said methods. The methods referred to are normally grouped under the general heading "methods for induced polarization", shortened to IP-methods. These methods are based on the fact that, when an electric field is created in the earth by passing an electric current into the ground through ground electrodes, electric charges and discharges take place, particularly in the boundary layers between ore minerals and certain other minerals, which cause disturbances in the normal electric fields. If an electric field which varies with time is applied, for example an alternating field from an AC current generator, the so-called IP-effects cause the AC voltage between two points in the vicinity of a disturbing body, such as a body of ore, to be different from what it would have been if no disturbing body had been present. The voltage may thereby be changed both with respect to amplitude and phase.

In practice, the aforementioned field is created by feeding an electric current from a current source into the ground through two ground electrodes or through an electrode system, which may comprise a large number of electrodes. In practice, the generated electric field is normally studied by measuring the voltage differences between potential measuring electrodes placed at two locations on the surface of the ground. The voltage differences are normally systematically determined between pairs of paints lying along one or more profiles. If drill holes are present within the area being measured it is also possible to obtain a three-dimensional image of the electric field.

When applying IP-methods in practice, a number of difficulties are encountered. Although methods have been proposed to overcome these difficulties, none of the methods has been found to be sufficiently effective.

If two electrodes are placed in the surface of the ground in spaced apart relationship, a voltage difference often exists therebetween. There are a number of reasons for this voltage difference. A relatively constant voltage difference, called self-potential or SP, may be caused by galvanic currents in the vicinity of decomposing ore bodies or also by the differences in concentration of electrolyte in the ground surface. Other causes of the aforementioned voltage difference include telluric currents, TP, of more regional scope, and artificial earth currents, AP, from power networks, railways and electric tram systems and the like. These latter disturbances create greater or smaller periodic AC voltages or transients which are superimposed on the voltage differences from the electric field to be studied, and therefore constitute a more serious disturbance problem than distrubances from the more constant self-potentional SP. To reduce the influence of the aforementioned disturbance sources attempts have been made to increase the field strength of the electric field applied to the ground, but this possibility is relatively limited owing to the fact that the voltage between the current electrodes must be increased to such an extent that the measuring apparatus becomes dangerous to handle.

The different IP-methods can, in principle, be divided into two groups, so called pulse methods and AC current methods.

With the pulse methods there is normally used a commuted DC current which is controlled so that the input current is applied over a specific period of time. The current is then broken for a certain period of time and then reapplied with reversed polarity for a period of time equal to the first mentioned period of time, and is then re-broken. This procedure is repeated in a regular pattern. With this type of measuring method the IP-effect is determined, i.e. the information upon which the subsequent geophysical evaluation is based, by measuring the decay of the voltage difference present between the measuring electrodes as a function of time. Thus, the voltage differences $\Delta V$ occurring between the potential electrodes, the measuring electrodes, are measured at certain time periods $t_1, t_2, t_3 \ldots \ldots$ after the current has been broken. The average voltage is measured technically within relatively short time periods $(t_1, t_1 + \Delta t), (t_2, t_2 + \Delta t)$ etc. Superimposed disturbances of the TP and AP type can thus deleteriously affect the measuring results if they happen to occur within the selected time intervals. One method of reducing disturbances from transients and disturbances of the latter type resides in selecting wider time intervals $t_1, t_1 + \Delta t$, i.e. a larger increment $\Delta t$, and by measuring the mean voltage as volt seconds/second, i.e. the integral:

$$\frac{1}{\Delta t} \int_{t_1}^{t_1+\Delta t} \Delta V dt$$

Naturally, in this instance the different time positions are less well defined. Thus, because of the disturbances, considerable difficulties exist in accurately determining the decay curve of the voltage difference, which in turn renders the subsequent geophysical evaluation unreliable.

When applying an alternating current-IP method, an alternating current is fed into the ground through the current electrodes. In this instance, the phase difference between the input alternating current and the AC voltage measured between the potential electrodes is determined to obtain information on the geological situation, the procedure being such that a voltage proportional to the primary current and a voltage proportional to the voltage difference between the potential electrodes are each applied to their respective pair of plates in an oscilloscope. The phase angle is then determined from the Lissajouimage formed on the image screen of the oscilloscope. In this instance the measuring system must have a relatively broad bandwidth, which implies a higher degree of sensitivity to TP and AP disturbances. When determining phase angles by means of Lissajou images there is always great uncertainty in the measuring result and an added disadvantage with this measuring method is that the measuring apparatus used therewith is often relatively cumbersome for field use.

With other known measuring processes using alternating current-IP-methods, the voltage detected from the potential electrodes is amplified, the amplitudes for different frequencies being mutually compared. The influence of both periodic and aperiodic TP and AP disturbances is also significant with this method.

For the purpose of obtaining better information on the electric field in geophysical measuring operations, it has previously been proposed to use alternating current compensation, whereby the measured voltage is determined with respect to phase and amplitude in relation to the input alternating current. Thus, with the known apparatus a wire connection is arranged between the current source and the measuring apparatus for transmitting the synchronizing signal required for the compensation measuring operation. These wire connections, however, are cumbersome and unpractical when used in the open countryside and, moreover, constitute a source of disturbance in the system. A further disadvantage with the known systems is that the measuring apparatus and current source must lie on the same DC voltage potential or must be provided with DC voltage insulating means, which can deleteriously affect the synchronization, particularly if measurements at different frequencies are to be made.

It has been suggested that the synchronizing arrangement can be simplified by placing in the measuring apparatus a precision clock, e.g. a quartz oscillator, for synchronizing the compensating voltage generating apparatus with the input alternating current, the clock being pre-synchronized with the alternating current feed-in from the current source, so that the clock operates at a known phase displacement, preferably 0°, in relation thereto.

The object of the present invention is to provide for prospecting work an improved method and an improved apparatus for determining the complex field with improved accuracy, reduced measuring time and the possibility of collecting data automatically in a simple manner.

Accordingly, the method of the present invention includes the steps of converting the potential differences to a pulse train having a frequency which is proportional to the instantaneous value of the voltage occurring as a result of the potential differences, counting the pulses in the pulse train for a determined length of time t, producing at least one reference voltage bearing a known relationship to the alternating current supplied to the ground, producing signals in response to the value of the reference voltage to determine whether a certain pulse of the pulse train should be added or subtracted during the counter of the pulses of the pulse train, reading the counted value of the pulses after the elapse of the predetermined length of time, decoding the value obtained by reading to a digital form, and visually indicating the digits thus produced.

Figure 2:
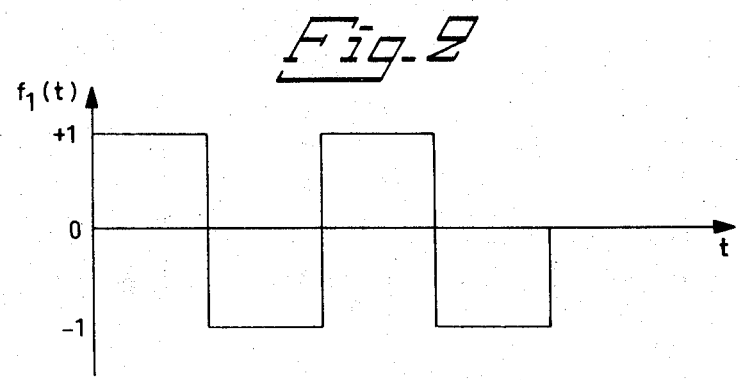
Figure 2:
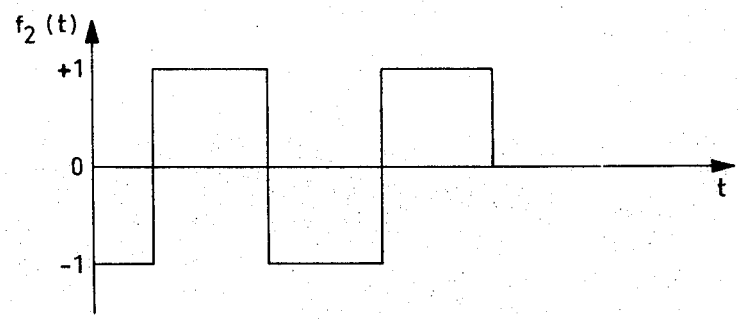

The system of the present invention is mainly characterized in that the measuring apparatus includes a converter for producing from the voltage picked up by at least two measuring electrodes an outgoing pulse train having a frequency which is proportional to the instantaneous amplitude of the voltage, at least one counter for counting the pulses of the outgoing pulse train during a determined counting time, the counter having a first input for the pulse train; means for producing at least one reference voltage bearing a known relationship to the alternating current supplied to ground, a control unit having an input for the reference voltage, and outputs supplying count-up and count-down information and read out and clearing information to the at least one counter, memory means having a first input for receiving the read out and clearing information and a second input connected to the output from the counter, decoder means arranged to transform information received from the memory means after the elapse of the predetermined counting time to digital form, and indicator means supplied by the decoder means for visually presenting the potential differences;

So that the invention will be more readily understood and further features thereof made apparent, the invention will now be described with reference to an embodiment thereof illustrated in the accompanying drawing, in which:

FIG. 1 shows a very simplified block diagram illustrating a current generator and a receiver or measuring apparatus, FIG. 2 shows a series of pulses, FIG. 3 illustrates the measuring apparatus or receiver in block diagram form, and FIG. 4 illustrates an example of the central control unit forming part of the measuring apparatus.

The system according to the invention is diagrammatically illustrated in FIG. 1, and includes a receiver 41 with a pair of electrodes 1, comprising electrodes P1 and P2, placed in the ground 43. An electric alternating field is supplied to the ground by means of a current generator 42 having ground electrodes P3 and P4. The current generator or transmitter 42 transmits a sinus-shaped current into the ground 43 at a frequency of e.g. 1 Hz. A reference voltage time related to said current is available in the receiver of measuring apparatus 41, said voltage having the property that the phase difference to the current is zero. This reference voltage is obtained from an oscillator in current generator 42 with which oscillator a corresponding oscillator in receiver 41 is synchronized. The synchronization is made by connecting generator 42 and receiver 41 together and operating adjusting means in the receiver 41. Such synchronization is preferably made in the morning before starting the field measuring work with receiver 41. Obtained between the pair of measuring electrodes 1 is a voltage $U(t)$ which comprises four components, namely 1. A voltage component in phase with the current transmitted from the current generator 42, said component hereinafter being referred to as the real component.
2. A voltage component 90° out of phase with the transmitted current said component hereinafter being referred to as the imaginary component.
3. The naturally occurring DC voltage components, i.e. the so called self-potential, between the measuring electrodes P1 and P2, said components hereinafter being referred to as the SP-components.
4. An undesired component comprising electrical disturbances in the ground, both from natural and artificial origins.

In accordance with the object of the invention, the voltage U(t) between the electrodes P1 and P2 shall be converted to a pulse train having a frequency which is proportional to the momentray value of the voltage. With this conversion procedure a magnitude mathematically designated "sign U(t)", i.e., the sign of the voltage U(t); shall also be obtained.

The voltage U(t) shall be integrated over a certain time interval T and the pulses shall therefore be counted during this interval with special respect taken to the sign U9t).

FIG. 2 shows two reference voltages $f_1(t)$ and $f_2(t)$, the former representing the real component and being in phase therewith, and the latter representing the imaginary component and being 90° out of phase therewith.

The first three components of the aforementioned voltage components can be written as the first three components in a Fourier series:

$$U(t) = U_{SP} + U_{Re} \sin \omega t + U_{Im} \cos \omega t \quad (1)$$

in which U(t) is the voltage across the measuring electrode pair 1, $U_{SP}$ is the SP-component, $U_{Re}$ is the real component, and $U_{Im}$ is the imaginary component.
In equation (1), $$U_{SP} = \frac{1}{T} \int_0^T U(t) dt \quad (2)$$

$$U_{Re} = \frac{2}{T} \int_0^T U(t) \cdot \sin \omega t \, dt \quad (3)$$

$$U_{Im} = \frac{2}{T} \int_0^T U(t) \cdot \cos \omega t \, dt \quad (4)$$

where T is the counting time,.

With the reference voltages shown in FIG. 2:

$$U_{SP} = \frac{1}{T} \int_0^T U(t) dt \quad (5)$$

$$U_{Re} = \frac{\pi}{2T} \int_0^T U(t) \cdot f_1(t) dt \quad (6)$$

$$U_{Im} = \frac{\pi}{2T} \int_0^T U(t) \cdot f_2(t) dt \quad (7)$$

and further:

$$U_{SP} = \frac{1}{T} \sum_{n=\frac{k}{\pi} \cdot U(t) \cdot t = 0}^{n=\frac{k}{\pi} \int_0^T U(t) \cdot t \, dt} \text{sign}[U(t)] \cdot F(\sin(K \cdot U(t) \cdot t)) \quad (8)$$

$$U_{RG} = \frac{\pi}{2T} \sum_{n=\frac{k}{\pi} \cdot U(t) \cdot t = 0}^{n=\frac{k}{\pi} \int_0^T U(t) \cdot t \, dt} \text{sign}[U(t)] \cdot f_1(t) \cdot F(\sin(k \cdot U(t) \cdot t)) \quad (9)$$

$$U_{Im} = \frac{\pi}{2T} \sum_{n=\frac{k}{\pi} \cdot U(t) \cdot t = 0}^{n=\frac{k}{\pi} \int_0^T U(t) \cdot t \, dt} \text{sign}[U(t)] \cdot f_2(t) \cdot F(\sin(k \cdot U(t) \cdot t)) \quad (10)$$

sign [U(t)] above can take the values + and −, corresponding to pulse addition and pulse subtraction respectively. $f_1(t)$ and $f_2(t)$ can take the value +1 or −1 (see the curves in FIG. 2).
$F(\sin(k \cdot U(t) \cdot t) = F(x)$ is 1 when $x$ equals $\sin(k \cdot U(t) \cdot t) = 0$
and is 0 when $x \neq 0$.
k is a constant.

The sought for magnitudes $U_{SP}$, $U_{Re}$ and $U_{Im}$ can thus be determined directly by means of electronic up-dawn counters which are controlled by the product sign-$[U(t)] \cdot f(t)$.

The reason for having an integrating measuring system is to obtain a high degree of noise and disturbance suppression. The integration time T is suitably selected as a multiple of the period time 1/60 seconds of the net frequency (60HZ) in order to obtain a high degree of suppression of the disturbances caused by the electric distribution net.

The mode of operation of the measuring apparatus (the receiver) will be described in more detail with reference to FIG. 3, which illustrates the measuring apparatus in block form.

The measuring voltage U(t) occurring between the measuring electrodes P1 and P2 (the terminal pair 1) is applied to the input of a voltage-to-frequency-converter 2 which converts this voltage of analogue character to a pulse train suitable for digital processing. As beforementioned, the signal from the measuring electrodes comprises a real, an imaginary and an SP-component and, in addition, disturbances superimposed thereon and caused by stochastic currents occurring naturally in the ground and by different types of earth currents caused by man. The pulse train produced by the converter 2 has a frequency proportional to the magnitude of the voltage occurring between the electrodes 1. This pulse train is applied to the output 3. Logic information on the polarity of the voltage is passed from the output 4 to a central control unit 5.

The measuring apparatus is divided into three parallel channels, intended for evaluating the real measuring component, the imaginary measuring component and the SP-measuring component respectively.

Each channel includes a counter 20, 21, 22, a pulse delay device 23, 24, 25, a memory device 26, 27, 28, a decoder 29, 30, 31 and a digital display 32, 33, 34.

To enable evaluation of the three measuring components it is necessary to have access to a reference voltage $f_1(t)$ in phase with the current transmitted from the current generator 42, and a reference voltage $f_2(t)$ 90° out of phase with said transmitted voltage. These two reference voltages are applied to the inputs 6 and 7, respectively of the control unit 5. The control unit 5 produces from the two reference voltages the control signals required for the three channels of the receiver. These control signals are count-up and count-down pulses and read and clear signals.

Data pulses from the converter output 3 are applied to the inputs 15, 17, 18 of the counters 20, 21 and 22 respectively of the three channels.

For controlling the counters there is required from the central control unit 5 a logic signal, which indicates count-up or count-down, and a signal pulse which clears the counters upon completion of a counting period.

The count-up and count-down signals are transmitted from the outputs 8, 9, 10 of the central control unit 5 to respective inputs 14, 16, 19 of the counters.

For controlling the memories 26, 27 and 28, signal pulses are required which instruct the memory devices to read the contents of the counters and to clear said counters immediately before the end of a counting period. The counting period may be selected by adjusting frequency dividers 35, 36 (FIG. 4), n being the number of cycles during which the picked-up voltage should be measured. The mentioned signal pulses are transmitted on respective outputs 11, 12 and 13 from the central control unit 5, and are also applied to respective pulse delay devices 23, 24 and 25. These pulse delay devices are arranged to produce the delay required between the read and clear instructions.

As will be understood from the aforegoing, the electronic counters 20, 21, 22 are able to count the number of pulses, and to count-up or count-down when instructed to do so by a logic signal. The memory devices 26, 27, 28, the decoders 29, 30, 31 and the digital displays 32, 33, 34 are required together for presenting the result of the counters. The mean values of the three intended signal components can be determined by separate logic control of the counting sequence. The counters in the three channels add or subtract the pulses in the data pulse train in response to the information from the central control unit 5. This operation continues for a period of time which is a multiple of the cycle time period of the current transmitted in the ground. This multiple may be arbitrarily selected. The higher the multiple is the more the undesirable disturbances are suppressed. The degree of disturbance suppression, however, is obtained at the cost of the measuring time. At the end of the counting period, the result on the counters is transferred to the memory devices and presented on the digit indicators. The counters are then cleared immediately and a new measuring sequence begins.

FIG. 4 illustrates an example of the construction of the central control unit.

Sign information (+ or −) is applied to input 4 as an input signal to two EXCLUSIVE-OR-gates 37, 38. The real reference signal $f_1$ is applied to input 6 as a second input signal to the EXCLUSIVE-OR-gate 37. The imaginary reference signal $f_2$ is applied to input 7 as a second input signal to the EXCLUSIVE-OR-gate 38. The latter components are also applied to their respective frequency dividers 35 and 36. The purpose of the frequency dividers is to establish the length of the counting period relative to the cycle time of the current transmitted in the ground and, in other words, divide the frequency with a selectable factor $n$.

The signals in question are each passed to their respective RC-link 39 and 40, the purpose of which is to give a short pulse for clearing and reading the counters. The time constant for the links in question should be less than the shortest period time from the voltage-to-frequency-converter 2. The gates 37 and 38 are gates which produce a first kind of output signal (e.g. 1) on their outputs 8 and 9 if the signals on their input pairs 6, 4 and 7, 4, respectively, are of different sign (i.e. + − or − +) but produce a second kind of output signal (e.g. 0) on their outputs if the corresponding inputs on the respective pair of inputs have the same sign (i.e. ++ or −−). In the present application output signal 1 is the count-down signal, whereas output signal 0 is the count-up signal.

The outputs from the control unit in FIG. 4 have the same reference numerals as in FIG. 3, and more specifically instructions for clearing and reading the real channel and the SP-channel are given from outputs 11, 13; instructions for count-up and count-down in the real channel are given from output 8; instructions for count-up and count-down in the SP-channel are given from output 10; instructions for count-up and count-down in the imaginary channel are given from output 9, and instructions for clearing and reading the imaginary channel are given from output 12.

The invention is not restricted to the illustrated and described embodiment but can be modified within the scope of the following claims.

I claim:

1. A method to be used in prospecting work for digitally determining the complex electric field generated in the ground when supplying an alternating current thereto, by determining potential differences in said field with respect to phase and amplitude, said method comprising the steps of:

1. picking up a first voltage between at least two points in the ground, said first voltage representing the potential differences induced by said current between these at least two points,
   2. converting said first voltage to a pulse train having a frequency which is proportional to the instantaneous values of said first voltage,
   3. counting the pulses in said pulse train for a predetermined length of time,
   4. producing at least one reference second voltage bearing a known relationship to said alternating current supplied to the ground,
   5. producing signals in response to the value of said at least one reference voltage to determine whether a certain pulse of said pulse train shall be added or subtracted during the counting of the pulses of said pulse train,
   6. reading the counted value of said pulses after the elapse of said predetermined length of time,
   7. decoding the value obtained by said reading to a digital form, and
   8. visually indicating the digits thus produced.

2. A method as claimed in claim 1, comprising the step of:

9. producing a signal representative of the sign of said first voltage, said sign signal having the value +1 for positive instantaneous values of said first voltage and the value −1 for negative instantaneous values of the first voltage, said signal representing the sign of said first voltage determining the values of said signals being used to determine whether a certain pulse shall be added or subtracted during said counting.

3. In a system for prospecting work a measuring apparatus for digitally determining the complex electric field generated in the ground when an alternating current is supplied thereto, by determining with respect to phase and amplitude potential differences in said field between at least two ground measuring electrodes forming part of said measuring apparatus, said apparatus comprising: a converter for producing from a first voltage picked up by said at least two measuring electrodes an outgoing pulse train having a frequency proportional to the instantaneous amplitude of said first voltage, at least one counter for counting the pulses of said outgoing pulse train during a predetermined counting time, said counter having a first input for said pulse train, means for producing at least one reference second voltage bearing a known relationship to said alternating current supplied to ground, a control unit having an input for said reference voltage, and outputs supplying count-up and count-down information and read out and clearing information to said at least one counter, memory means having a first input for receiving said read out and clearing information and a second input connected to the output from said counter, decoder means arranged to transform information received from said memory means after the elapse of said predetermined counting time to a digital form, and indicator means supplied by said decoder means for visually presenting said potential differences.

4. A measuring apparatus as claimed in claim 3, comprising means for producing a signal representative of the sign of said first voltage, said sign signal having the value +1 for positive instantaneous values of said first voltage and the value −1 for negative instantaneous values of the first voltage, and wherein the control unit has an input for logic information relating to the polarity of the first voltage picked up by said measuring electrodes.

5. A measuring apparatus as claimed in claim 4, in a system, wherein the first voltage obtained across said at least two measuring electrodes has three main components including a DC voltage component created by natural causes between said measuring electrodes, a real voltage component in phase with the current supplied to the ground, and an imaginary voltage component 90° out of phase with said current supplied to the ground, said apparatus comprising a respective measuring channel for each of said components, each measuring channel including in tandem arrangement a counter, a memory device, a decoder and a digit indicator, said counters each having a first input for receiving said pulse train, a second input for receiving individual count-up and count-down signals and a third input for receiving individual read-out and clearing pulses over associated delay devices, each memory device having a first input for receiving said read-out and clearing pulses and a second input for receiving, during read-out, the counting result from its associated counter, the output signals from the memory devices being arranged to be presented, via said decoders, on the respective digit indicators to visualize the values of said three components.

6. A measuring apparatus as claimed in claim 5, wherein the control unit comprises a first EXCLUSIVE-OR-gate having a first input for the application of a real reference voltage component and a second input for the application of the signal representative of said sign, a second EXCLUSIVE-OR-gate having a first input for the application of an imaginary reference voltage component and a second input for the application of the signal representative of said sign, said first gate being arranged to produce as an output signal an instruction signal for count-up and count-down in the real channel, and the second gate being arranged to produce as an output signal an instruction signal for count-up and count-down in the imaginary channel, the signal representative of said sign being also a count-up and count-down signal for the DC voltage signal.

7. A measuring apparatus as claimed in claim 6, comprising a first frequency divider arranged to receive the real reference voltage component, a second frequency divider arranged to receive the imaginary reference voltage component, said frequency dividers being arranged to determine the length of the counting period, and a respective RC link connected to the output of the respective frequency dividers to generate short clearing and read-out pulses to the real channel, to the DC voltage channel, and to the imaginary channel, respectively.

* * * * *